March 2, 1954
B. HABIB
2,671,209
FISHING ROD LIGHT
Filed Nov. 19, 1949
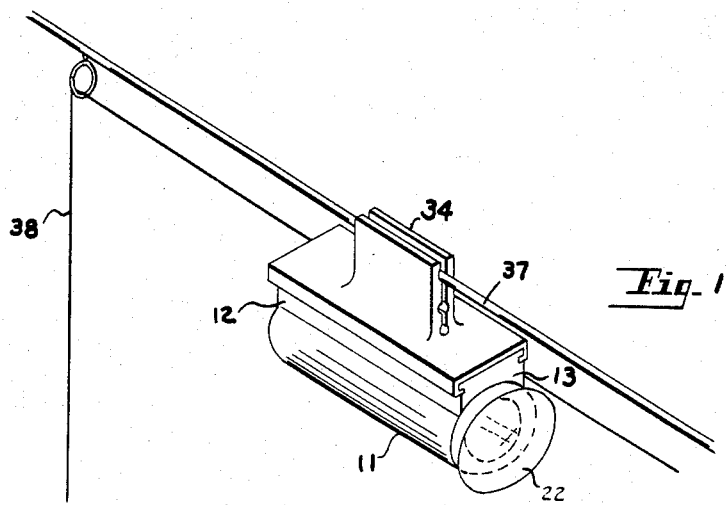
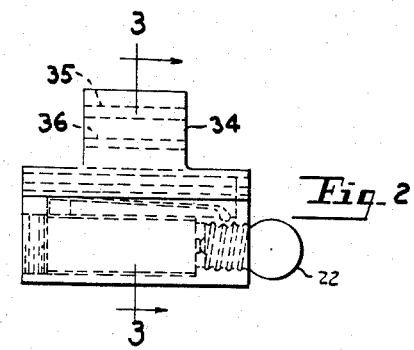
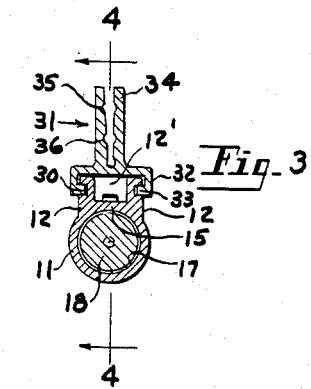
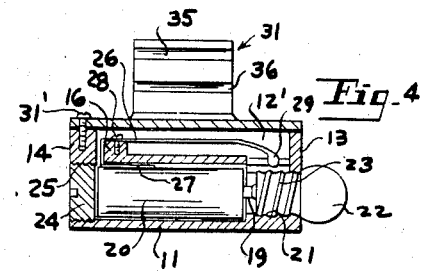
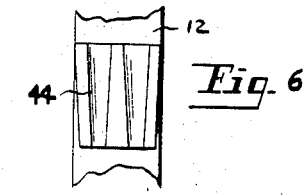
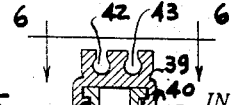
INVENTOR.
BACKUS HABIB.
BY Robert A. Sloman
ATTORNEY.

Patented Mar. 2, 1954

2,671,209

UNITED STATES PATENT OFFICE 2,671,209

FISHING ROD LIGHT

Backus Habib, Detroit, Mich.

Application November 19, 1949, Serial No. 128,446

2 Claims. (Cl. 340—261)

This invention relates to flashlight constructions, and more particularly to a novel flashlight with a vibratory switch sympathetic to external vibrations for intermittently closing the electrical circuit to the battery and bulb.

It is the object of the present invention to provide a flashlight construction which includes a vibrator switch normally in open position relative to the electrical circuit but adapted to intermittently close said circuit upon the transmission of vibrations to the flashlight housing from an external source.

It is the further object of this invention to provide such flashlight construction adapted for use in conjunction with a fishing rod, being particularly useful for night fishing to indicate a nibble on the fish bait at the end of the line. This would be particularly useful where the fishing rod is not held by the individual.

It is the further object of this invention to provide a suitable clip in conjunction with the flashlight casing, whereby the latter may be easily fastened to a portion of the fishing rod.

These and other objects will be seen from the following specification and claims in conjunction with the appended drawing in which:

Fig. 1 is a perspective view of the flashlight as mounted upon a fishing rod which is fragmentarily shown.

Fig. 2 is a right side elevational view of the flashlight.

Fig. 3 is a section on line 3—3 of Fig. 2.

Fig. 4 is a section on line 4—4 of Fig. 3.

Fig. 5 is a fragmentary elevational section illustrating a different type of clip construction; and Fig. 6 is a plan view on line 6—6 of Fig. 5.

It will be understood that the above drawing illustrates merely a preferred embodiment of the invention and that other embodiments are contemplated within the scope of the claims hereafter set out.

Referring to the drawing the hollow cylindrically shaped casing 11 preferably constructed of a plastic material has a pair of parallel upright spaced side wall extensions 12 defining the space 12'. The casing includes the upright end wall 13 at one end and the corresponding upright end wall 14 at its opposite end, said casing, said extensions 12, and said walls 13 and 14 being formed or moulded as a unitary structure.

The intermediate wall 15 between hollow cylindrical battery chamber 17 and vibrator chamber 12' terminates in an upright portion 16 arranged in spaced relation to the end wall 14.

The dry cell 1 or 2 volt battery 18 is nested within cylindrical chamber 17, and has the central terminal 19 and a second terminal being the metallic electrically conductive casing 20 of the battery.

Threaded opening 21 is formed within the end wall 13 and is adapted to receive and retain the corresponding threaded terminal 23 of bulb 22 as shown in Fig. 4. At the same time the central terminal of the bulb is in registry with the central terminal 19 of battery 18.

A suitable screw plug 24 is positioned within the threaded opening 25 formed through the opposite end wall 14 to thereby permit insertion and removal of said battery.

A metallic conductive switch element 26 has a U-shaped end portion 27 which is formed under tension and which is projected over one end of the casing wall 15, being secured to the raised block 16 which forms a part of said wall as by the adjusting screw 28.

The switch element 26 includes a flexible vibratory element at its opposite end which terminates in the contact 29, being adapted for vibratory movement within chamber 12' and with the contact 29 adapted for intermittent electrical contact with terminal 23 of bulb 22. However it will be noted that contact 29 is normally out of engagement with bulb terminal 23 so that normally there is an open circuit through the bulb, battery and switch.

The intermediate wall 15 between chambers 12' and 17 terminates at its opposite end in substantial spaced relation from the end wall 13 thereby providing a space into which contact 29 may freely move so as to engage terminal 23 of said bulb.

The screw 28 may be manually regulated to thereby control the sensitivity of the vibrator 29, as it will be remembered that its U-shape portion 27 has been formed under tension. Furthermore the vibrator arm which terminates in the contact 29 is freely flexible so that the slightest exterior vibration transmitted to the casing 11 will be in turn sympathetically transmitted to said vibrator causing the same to vibrate into and out of electrical contact with terminal 23 of the bulb 22. This will produce an intermittent flashing of the bulb 22.

The present embodiment of this invention contemplates employing this flashlight construction in conjunction with a fishing rod for use during night fishing to indicate a fish nibble which would normally transmit vibrations to the fishing rod through the fishing line 38 such as shown in Fig. 1. This would be particularly useful as where the fish rod is supported other than by the hands, with entire reliance upon the flashlight to indicate a nibble on the line.

As shown in Figs. 1 and 3 parallel slots 30 are formed in the outside surface of the wall extensions 12 and are adapted to receive the oppositely arranged inturned flanges 33 which project from the extensions 32 forming a part of the casing clip generally indicated at 31.

Clip 31 includes the slightly diverging resilient rod engaging extensions 34 which are integral with and form a part of the extensions 32 of said clip. As shown in the drawing there are a pair of spaced longitudinal arcuate slotted portions of different diameter 35 and 36 which are formed within the interior surfaces of the clip extensions 34. Said longitudinal slot formations are adapted to cooperatively receive a portion of the fish pole 37 selectively depending upon its diameter, and the clip is frictionally slid along the pole until the latter is tightly engaged within slots 35 or 36.

As shown in Figs. 5 and 6 the clip 40 is of a slightly different construction, and includes the upright portion 39 and the inwardly projecting elements 41 which are cooperatively received within corresponding external slots 30 in the casing or wall elements 12 of the casing.

There are a pair of longitudinally extending slots 42 and 43 of varying diameter formed within the clip element 39, with said slots terminating in the throat portions 44 of reduced dimension. By this construction the fishing rod 37 can be snapped into the proper opening 42 or 43 after which said clip may be slid upon the rod so as to frictionally lock itself in position.

Referring to Fig. 4 there is shown a screw 31' whereby the clip 31 is effectively secured to the end wall 14 forming a part of the flashlight casing. Naturally any other suitable mechanism could be employed for this purpose.

Having described my invention, reference should now be had to the claims which follow for determining the scope thereof.

I claim:

1. In a flashlight having a hollow cylindrical casing, parallel spaced sidewall extensions throughout the length of said casing defining a vibrator chamber, a battery within said casing, a bulb threaded into said casing with one terminal engaging the central terminal of said battery, a switch secured to said casing and positioned within said chamber, said switch including an elongated flexible freely vibratory conductive element terminating at one end in a contact portion, said contact portion being intermittently engageable with the other terminal of said bulb for opening and closing the electrical circuit therethrough upon transmission to said casing of any exterior vibration the other end of said vibratory element being formed into U-shape and in contact with the other terminal of said battery, and an adjustable screw securing said switch to said casing intermediate the ends of said conductive element to regulate the sensitivity of said vibratory contact.

2. In a flashlight having a hollow cylindrical casing, parallel spaced sidewall extensions throughout the length of said casing defining a vibrator chamber, a battery within said casing, a bulb threaded into said casing with one terminal engaging the central terminal of said battery, a switch secured to said casing and positioned within said chamber, said switch including an elongated flexible freely vibratory conductive element terminating in a contact portion, said contact portion being intermittently engageable with the other terminal of said bulb for opening and closing the electrical circuit therethrough upon transmission to said casing of any exterior vibration, said sidewall extensions having formed in their outer surfaces parallel longitudinal slots throughout their length adapted to receive portions of a cover of said chamber, and a cover for said chamber having a pair of spaced inturned longitudinal flanges adapted to be slidably secured within said slots.

BACKUS HABIB.

References Cited in the file of this patent

UNITED STATES PATENTS

| Number | Name | Date |
|---|---|---|
| 1,891,493 | Apostoloff | Dec. 20, 1932 |
| 2,196,784 | Simmons et al. | Apr. 9, 1940 |
| 2,262,040 | Van Dyne Pell | Nov. 11, 1941 |
| 2,354,279 | Ross | July 25, 1944 |
| 2,454,896 | Traub | Nov. 30, 1948 |

FOREIGN PATENTS

| Number | Country | Date |
|---|---|---|
| 218,536 | Switzerland | Nov. 16, 1942 |